United States Patent
Jellison et al.

[15] 3,674,283
[45] July 4, 1972

[54] SUSPENSION STRUT

[72] Inventors: Frank R. Jellison, Canton; John B. Mason, Hudson, both of Ohio; Terry K. McQueen, Princeton, Ind.

[73] Assignee: General Motors Corporation, Detroit, Mich.

[22] Filed: Nov. 24, 1970

[21] Appl. No.: 92,420

[52] U.S. Cl. ...........................280/124 R, 267/21, 267/63
[51] Int. Cl. ....................................................B60g 11/24
[58] Field of Search...........................280/124 R; 267/21, 63

[56] References Cited

UNITED STATES PATENTS 3,372,947   3/1968   Doennecke...........................280/124

3,323,786   6/1967   Boschi.....................................267/63

Primary Examiner—Philip Goodman
Attorney—J. L. Carpenter and E. J. Biskup

[57] ABSTRACT

A suspension strut adapted to be connected between a vehicle frame and a wheeled axle. The suspension strut includes an elongated housing which is divided by a transverse wall into upper and lower sections, each of which contains a plurality of rubber pads. The opposite ends of the suspension strut are closed by end cap members which are independently adjustable for preloading the strut and are movable relative to the housing in a longitudinal direction for causing the rubber pads to be alternately compressed and expanded.

3 Claims, 4 Drawing Figures

PATENTED JUL 4 1972

3,674,283

INVENTORS
Frank R. Jellison,
BY John B. Mason &
Terry K. McQueen

C. J. Biskup
ATTORNEY

SUSPENSION STRUT

The invention concerns a suspension strut for use with an off-highway truck that is characterized in that the strut utilizes a plurality of rubber pads arranged in a manner so as to provide good ride characteristics when the vehicle is loaded and unloaded. More particularly, the suspension strut according to the present invention is divided into two cushioning sections, each of which includes a plurality of rubber-type pads. One of the cushioning sections serves as the primary spring support when the vehicle is unloaded and is gradually rendered ineffective as the vehicle is loaded. Thereafter, the other cushioning section serves as the primary spring support for the heavily loaded vehicle.

In the preferred form, the suspension strut according to the invention includes an elongated housing having a pair of laterally spaced longitudinally extending openings formed in one end of the housing. The other end of the housing is formed with a single longitudinally extending opening and is separated from the aforementioned pair of longitudinally extending openings by a transverse wall rigidly formed with the housing. A first end cap member has a portion adapted to be connected to a vehicle frame and another portion formed with a pair of laterally spaced pistons. The end cap member is connected to the housing by a pair of longitudinally extending guide rods which position the pistons within the pair of openings formed at one end of the housing. A second end cap member has a portion that is adapted to be connected to a wheeled axle and another portion formed with a single piston. As in the case of the first end cap member, a pair of guide rods connect the second end cap member to the housing with the piston located within the single opening formed therein. A plurality of rubber pads are located in each of the longitudinally extending openings between each of the pistons and the transverse wall for permitting the rubber pads to be alternately compressed and expanded as a result of longitudinal movement of the end cap members relative to the housing.

The objects of the present invention are to provide a suspension strut divided into two cushioning sections and having a plurality of rubber pads located in each of the sections in a manner so as to provide dual stage ride characteristics; to provide a suspension strut for a vehicle which includes a plurality of rubber pads arranged in a series-parallel fashion so as to provide good ride characteristics when the vehicle is loaded and unloaded; to provide a suspension strut for a vehicle having two cushioning sections, each of which is provided with a plurality of rubber pads, with one cushioning section being primarily effective during a first range of loads and the second cushioning section being effective during a heavier range of loads; to provide a suspension strut having two sets of rubber pads located at opposite ends of the strut and separated from each other in a manner so that each set can be independently preloaded to a predetermined load level; to provide a ride strut for a vehicle having an elongated hollow housing which is divided by a transverse wall into a pair of axially spaced cushioning sections having a plurality of rubber pads; and to provide a rubber strut suspension device for a vehicle having a pair of end cap members, each of which is movable relative to a support housing a varying amount depending upon the load placed on the strut.

Other objects and advantages of the present invention will be more apparent from the following detailed description when taken with the drawings in which.

Figure 1:
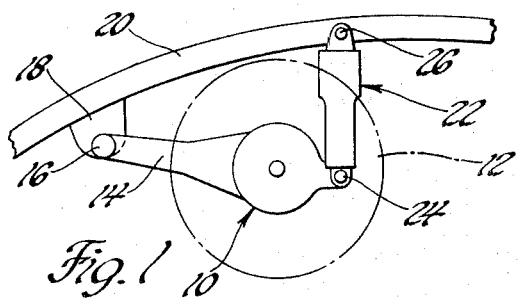
FIG. 1 is an elevational view showing a vehicle suspension arrangement incorporating a suspension strut made in accordance with the invention.

Referring to the drawings and more particularly FIG. 1 thereof, a suspension arrangement for a vehicle is shown comprising a transverse axle 10, the opposite ends of which are provided with rotatable wheels, one of which is shown in phantom lines and indicated by the reference numeral 12. The axle 10 is integrally formed with a forwardly extending yoke member 14 connected by a ball and socket arrangement 16 to a depending bracket 18 rigidly secured with the vehicle frame 20. Located between the frame 20 and the axle 10 are a pair of suspension struts 22 made in accordance with the invention and serving as spring devices for resiliently supporting the vehicle chassis and cushioning oscillatory movement of the axle 10. Only one suspension strut 22 is shown and it is generally vertically orientated with its lower end connected by a pivotal connection 24 to the axle 10, while the upper end is connected by a pivotal connection 26 to the frame 20.

Figure 2:
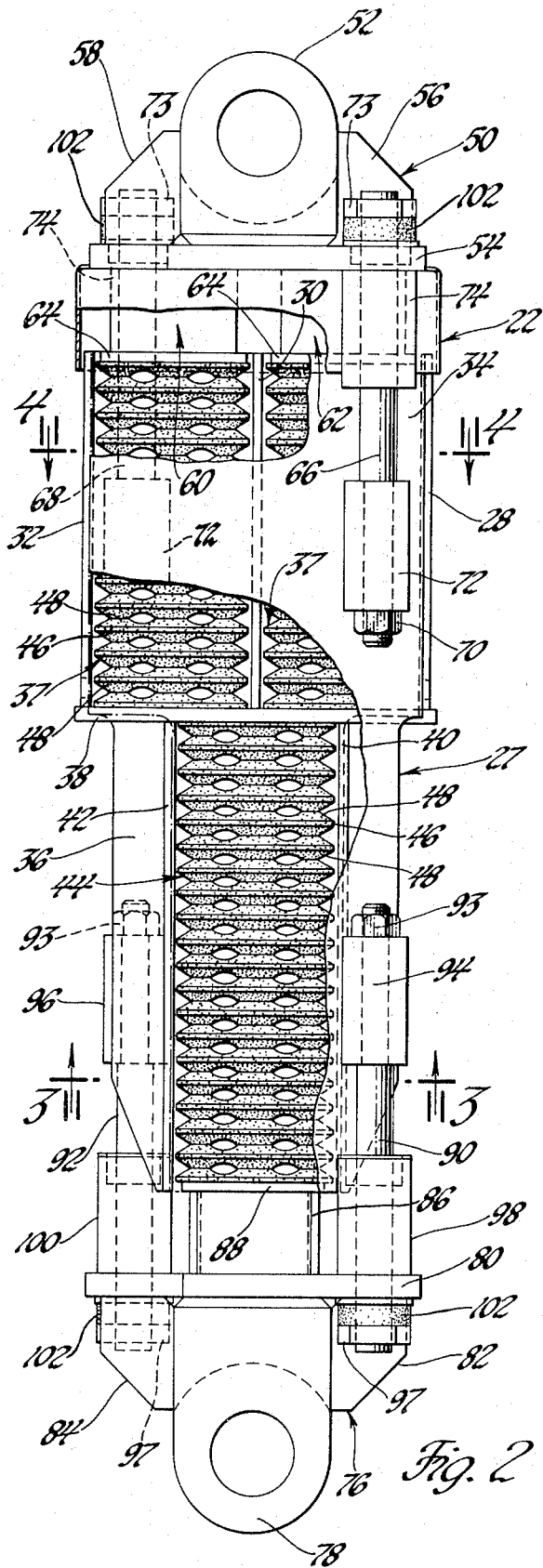
FIG. 2 is an enlarged view of the suspension strut shown in FIG. 1 with certain parts broken away so as to show the interior of the strut.

More specifically and as seen in FIG. 2, the suspension strut 22 comprises an elongated housing 27 having an upper cushioning section and a lower cushioning section. The upper cushioning section is formed by three vertically orientated walls 28, 30 and 32, each of which is rigidly secured at the vertical edges thereof to the upper portions of a pair of side walls 34 and 36. The wall 30 is located in a plane parallel to the planes of walls 28 and 32 and is positioned midway between the latter-mentioned walls. Thus, a pair of generally rectangular elongated openings are formed in the upper cushioning section of the housing 27 and each opening is filled with a plurality of rectangularly shaped rubber-type pads 37 which rest on a transverse wall 38 that is rigidly secured to the lower edges of the walls 28, 30, 32 and to the side walls 34 and 36.

Figure 3:
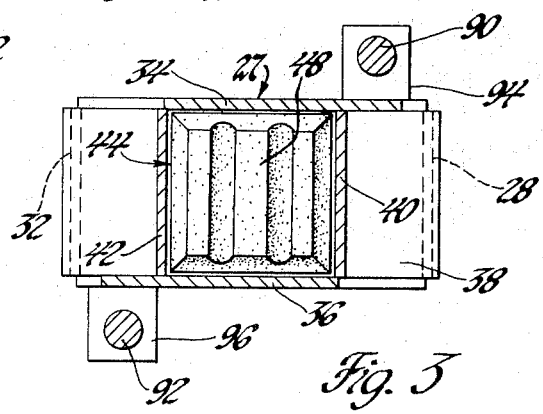
FIG. 3 is a sectional view taken on line 3—3 of FIG. 2.
Figure 4:
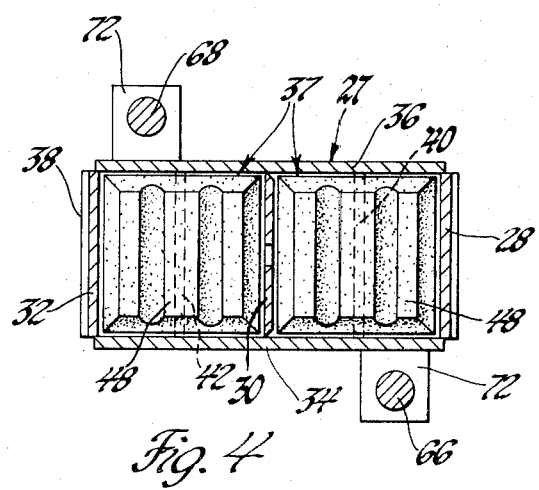
FIG. 4 is a sectional view taken on line 4—4 of FIG. 2.

The lower cushioning section of the housing 27 is formed by the lower portion of the side walls 34 and 36 and a pair of vertically orientated walls 40 and 42. The upper ends of walls 40 and 42 are rigidly connected to the transverse wall 38, while the side edges are fixed with the side walls 34 and 36. Thus, as seen in FIG. 3, the lower cushioning section has a single elongated opening which is rectangular in cross section for supporting a plurality of rectangularly shaped rubber-type pads 44. In this regard, it will be noted that the pads 37 and 44 are identical in construction, each comprising a rectangular base plate 46, one or both sides of which is bonded to a layer 48 of elastomeric material.

The upper cushioning section of housing 27 is closed by an end cap member 50, the upper portion of which includes an eyelet mount 52 which constitutes one part of the pivotal connection 26. The eyelet mount 52 is rigidly secured to the upper surface of a rectangular plate member 54 by a pair of end supports 56 and 58. The lower surface of the plate member 54 is formed with a pair of spaced pistons 60 and 62, each of which includes an end plate 64 corresponding in configuration to the cross sectional configuration of the openings in the upper cushioning section of the housing 27. The pistons 60 and 62 are adapted to register with the openings, engage the upper ends of the rubber pads 37 located therein, and move relative to the housing 27 along the longitudinal axis thereof. In order to realize such movement, a pair of guide rods 66 and 68 are located on opposite sides of the suspension strut 22 with the lower end of each guide rod being connected by a nut 70 to an outwardly projecting ear 72 rigidly secured to the associated side wall. The other end of each guide rod terminates with a rigidly formed enlarged head 73 and has an intermediate portion slidably received within an ear 74 rigidly connected to the plate member 54.

As in the case of the upper cushioning section, the lower cushioning section is formed with an end cap member 76, the lower end of which has an eyelet mount 78 which constitutes one part of the pivotal connection 24. The eyelet mount 78 is rigidly attached to a rectangular plate member 80 by a pair of end supports 82 and 84. The upper surface of the plate member 80 is formed with a single piston 86 having an end plate 88 which corresponds in configuration with the cross sectional shape of the opening and is adapted to engage the lower end of the stack of rubber pads 44 in the lower cushioning section. The end cap member 76 is also movable along the longitudinal axis of the housing 27 and guidance is provided by a pair of guide rods 90 and 92, the upper ends of which are secured by nuts 93 to ears 94 and 96, respectively formed with the offset portions of side walls 34 and 36 as seen in FIG. 3. The lower ends of the guide rods 90 and 92 terminate with integral enlarged heads 97 and are slidably received within ears 98 and 100, respectively, rigidly connected to the upper surface of the plate member 80.

One advantage of the suspension strut 22 described above is that the upper and lower cushioning sections can be independently preloaded so as to provide desired ride characteristics when the vehicle is loaded and unloaded. In this regard, it will be noted that the lower cushioning section has a single row of rubber pads 44 which is preloaded by torquing the nuts 93 while the upper cushioning section has a double row of rubber pads 37 which are preloaded by torquing the nuts 70. By proper preloading of the cushioning sections, it is possible to permit the single row of rubber pads 44 to serve as the primary spring means when the vehicle is unloaded. Under such circumstances, both cushioning sections will support the weight of the vehicle, however, the end cap member 76 will move the greater distance relative to the housing 27 and cause compression and expansion of the rubber pads 44 during jouncing of the axle. As the vehicle's load is increased, the end cap member will gradually move upwards compressing rubber pads 44 until the plate member 80 contacts the lower end of the housing 27. At such time, the end cap member 76 and the housing 27 will, in effect, be one single rigid unit and the rubber pads 37 in the upper cushioning section will serve as the primary spring support and the ride characteristics will be determined thereby. It will be noted also that each of the guide rods 66, 68, 90 and 92 has an elastomeric bumper 102 located between the enlarged head and the associated ear for cushioning axle rebound.

Various changes and modifications can be made in this construction without departing from the spirit of the invention. Such changes and modifications are contemplated by the inventors and they do not wish to be limited except by the scope of the appended claims.

We claim:

1. A suspension strut adapted to be connected between a vehicle frame member and a wheeled axle member, said suspension strut comprising an elongated housing having a longitudinally extending opening formed in each end of said housing, a transverse wall rigidly formed with said housing and separating said longitudinally extending opening formed in each end of said housing, a first end cap adapted to be connected to said vehicle frame member and having a piston, first means connecting said first end cap to one end of said housing for relative longitudinal movement therebetween with said piston registering with one of said longitudinally extending openings, a second end cap adapted to be connected to said wheeled axle member and having a piston, second means connecting said second end cap to the other end of said housing for relative longitudinal movement therebetween with said latter-mentioned piston registering with the other of said longitudinally extending openings, a plurality of resilient pads located in each of said longitudinally extending openings between each piston and said transverse wall for alternate compression and expansion as a result of longitudinal movement of the end caps relative to the housing, said first means including a guide rod having a threaded connection for preloading the resilient pads in said one of said longitudinally extending openings, and said second means including a guide rod having a threaded connection for preloading the resilient pads in said other of said longitudinally extending openings.

2. A dual stage variable rate suspension strut adapted to be connected between a vehicle frame member and a wheeled axle member, said suspension strut comprising an elongated housing having a pair of laterally spaced longitudinally extending openings formed in one end of said housing and a single longitudinally extending opening formed in the other end of said housing, a transverse wall rigidly formed with said housing and dividing said pair of longitudinally extending openings from said single longitudinally extending opening, a first end cap adapted to be connected to one of said members and having a pair of plunger sections, means connecting said first end cap to said housing for relative longitudinal movement therebetween with said pair of plunger sections registering with said pair of longitudinally extending openings, a second end cap adapted to be connected to the other of said members and having a single plunger section, means connecting said second end cap to said housing for relative longitudinal movement therebetween with said single plunger section registering with said single longitudinally extending opening, and a plurality of rubber pads located in each of said longitudinally extending openings between each plunger section and said transverse wall for alternate compression and expansion as a result of longitudinal movement of the end caps relative to the housing.

3. In combination with a vehicle having a frame member and a wheeled axle member, a dual stage variable rate suspension strut adapted to be connected between said frame member and said axle member, said suspension strut comprising an elongated housing having a pair of laterally spaced longitudinally extending openings formed in one end of said housing and a single longitudinally extending opening formed in the other end of said housing, a transverse wall rigidly formed with said housing and separating said pair of longitudinally extending openings from said single longitudinally extending opening, a first end cap adapted to be connected to one of said members and having a pair of pistons, first means connecting said first end cap to said housing for relative longitudinal movement therebetween with said pair of pistons registering with said pair of longitudinally extending openings, a second end cap adapted to be connected to the other of said members and having a single piston, second means connecting said second end cap to said housing for relative longitudinal movement therebetween with said single piston registering with said single longitudinally extending opening, a plurality of rubber pads located in each of said longitudinally extending openings between each piston and said transverse wall for alternate compression and expansion as a result of longitudinal movement of the end caps relative to the housing, said first means including a pair of guide rods located outboard of said housing and each having a threaded connection for preloading the rubber pads in said pair of longitudinally extending openings, and said second means including a pair of guide rods located outboard of said housing and each having a threaded connection for preloading the rubber pads in said single longitudinally extending opening.

* * * * *